E. E. HENDERSON.
NUT BOWL.
APPLICATION FILED APR. 30, 1914.
1,113,990.
Patented Oct. 20, 1914.
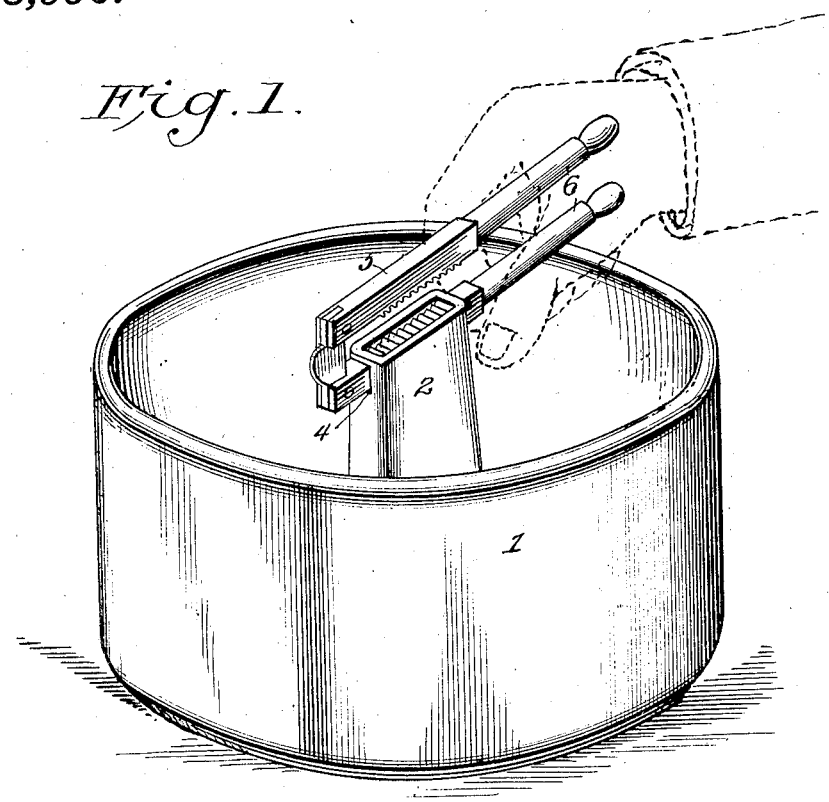
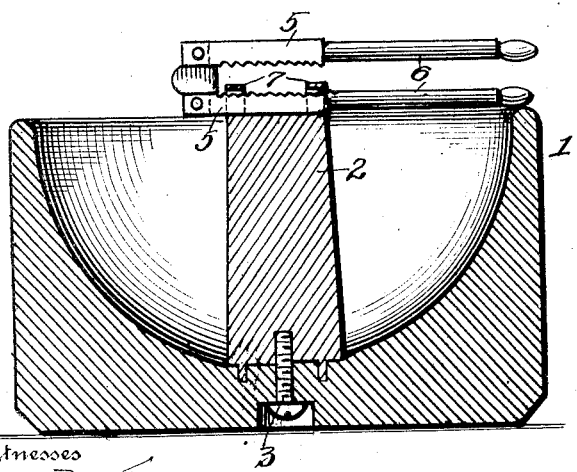
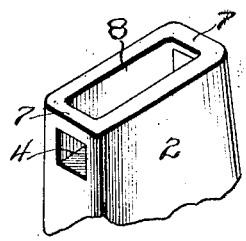
Inventor
E. E. Henderson
By A. M. Wilson
Attorney
Witnesses

UNITED STATES PATENT OFFICE.

EMMA E. HENDERSON, OF DENVER, COLORADO.

NUT-BOWL.

1,113,990.  Specification of Letters Patent.  Patented Oct. 20, 1914.

Application filed April 30, 1914. Serial No. 835,477.

*To all whom it may concern:*

Be it known that I, EMMA E. HENDERSON, a citizen of the United States, and residing at Denver, in the county of Denver and State of Colorado, have invented certain new and useful Improvements in Nut-Bowls, of which the following is a specification.

This invention relates to nut bowls, and its primary object is, to provide a bowl with a nut cracker so attached within the bowl, as to serve as a handle for lifting or passing the bowl.

A further object of the invention is to provide a bowl with a centrally-projecting standard provided with a seat to receive one of the pivoted members of a nut-cracker and support the same in the proper horizontal position to co-act with the other pivoted member, thus permitting a nut to be conveniently cracked within the bowl.

The construction of the improved bowl will be fully described hereinafter in connection with the accompanying drawing which constitutes a part of this specification, and its features of novelty will be set forth and defined in the appended claims.

In the drawing: Figure 1 is a perspective view of a nut-bowl, embodying the invention, with a nut cracker in position therein. Fig. 2 is a central vertical section of the bowl, the cracker being shown in elevation, and Fig. 3 is a detail perspective view, partly broken away, of the upper end of the standard.

The reference numeral 1 designates a bowl of the usual or any desired form, provided with a central supporting standard 2 secured to the bottom of the bowl by any preferred fastening means, the means here shown (Fig. 2) consisting of a central screw 3 extending through an opening in the bowl and into the standard.

While the invention comprehends and includes standards of any desired cross-sectional contour, the standard 2 shown in the drawing is a casting of a somewhat rectangular form or elongated in cross-section. This construction affords space at the upper end of the standard for the formation of a recessed seat 4 of sufficient length to receive and properly support one of the pivoted members of an ordinary nut cracker consisting of two similar members pivotally-connected together at one end, and each comprising a serrated jaw portion 5 and a handle portion 6.

The member 5 is adapted to snugly fit within the seat 4, and be retained therein detachably by any preferred means, the retaining means illustrated being two end bars 7, spanning the recessed seat to serve as keepers, and which are formed integral with the casting. This casting provides an inexpensive and effective securing means for the nut cracker, permitting one or the other member thereof to be readily slid into the seat 4 below the keepers, and securing said member in position with its serrated jaw portion flush with the adjacent side portions 8 of the standard. This leaves the other member of the cracker in projected position above the secured member ready for use as a nut cracker, and also alines the two members so that their handle portions may be readily grasped to lift the bowl and thus serve as a convenient handle for the latter.

The utility of the invention will be apparent from the illustration in the drawing in connection with the foregoing description, but it may be added that the device not only provides a bowl for which the nut cracker serves as the handle for lifting and passing, but the attachment of the nut-cracker centrally within the bowl renders the use of the cracker most convenient, the standard serving as a base for supporting the nut, and the upwardly-extending sides and edges of the bowl affording an effective guard to catch broken pieces of shell.

What is claimed as new is:—

1. A nut-bowl provided with a support projecting upward centrally from the bottom of the bowl, having a seat at its upper end, in combination with a nut-cracker comprising a pair of pivoted jaws, one of the jaws of which is secured in said seat leaving the other jaw in position for pivotal movement.

2. The combination with a nut-bowl, of a support of elongated shape in cross-section projecting upwardly from the bowl, and formed at its upper end with a recessed seat extending throughout the longer diameter of the support, and a nut-cracker consisting of co-acting pivoted members having one of its pivoted members secured in said seat, whereby the cracker is suitably supported for use in cracking nuts, and also serves as a handle for the bowl.

3. The combination with a nut-bowl, having a standard projecting centrally from the bottom of the bowl, and provided at its upper end with a seat, of a nut-cracker consisting of a pair of co-acting members, one of said members resting on said seat, and means for securing said member to adapt
5 the nut-cracker to serve as a bowl handle.

4. The combination with a nut-bowl provided with a standard projecting upward from the center of the bowl and a nut-cracker consisting of two co-acting pivoted
10 members each having a handle, and one of which is detachably secured to said standard and adapted to serve as a handle for the bowl.

In testimony whereof I affix my signature in presence of two witnesses.

EMMA E. HENDERSON.

Witnesses:
CARRIE W. BEEKMAN,
DORA V. SNYDER.

---

Copies of this patent may be obtained for five cents each, by addressing the "Commissioner of Patents, Washington, D. C."